(12) United States Patent
Lisec

(10) Patent No.: US 6,606,927 B1
(45) Date of Patent: Aug. 19, 2003

(54) PROCESS AND DEVICE FOR CUTTING THROUGH FILMS IN LAMINATED GLASS

(76) Inventor: Peter Lisec, Bahnhofstr. 34, A-3363 Amstetten-Hausmening (AT)

( * ) Notice: Subject to any disclaimer, the term of this patent is extended or adjusted under 35 U.S.C. 154(b) by 89 days.

(21) Appl. No.: 09/714,162

(22) Filed: Nov. 17, 2000

(30) Foreign Application Priority Data

Dec. 13, 1999 (AT) .................................................. 2095/99
Feb. 1, 2000 (AT) ............................................. 151/2000

(51) Int. Cl.[7] ................................................. B26D 1/00
(52) U.S. Cl. .............................. 83/13; 83/564; 83/614
(58) Field of Search ........................ 83/564, 881, 368, 83/614, 880, 15, 13

(56) References Cited

U.S. PATENT DOCUMENTS

| | | | | |
|---|---|---|---|---|
| 1,731,820 A | * | 10/1929 | Lewis ...................... 125/13.01 |
| 1,738,229 A | * | 12/1929 | Campbell et al. ............... 225/2 |
| 1,774,225 A | * | 8/1930 | Bredin ......................... 83/485 |
| 3,080,784 A | * | 3/1963 | Schneider ..................... 83/575 |
| 3,821,910 A | * | 7/1974 | Tjaden ......................... 83/881 |
| 4,094,217 A | * | 6/1978 | Exline ......................... 83/368 |
| 4,226,153 A | * | 10/1980 | Insolio ........................ 83/881 |
| 4,228,711 A | * | 10/1980 | Insolio ........................ 83/881 |
| 4,471,895 A | * | 9/1984 | Lisec, Jr. ....................... 225/2 |
| 4,558,622 A | * | 12/1985 | Tausheck ..................... 83/885 |
| 4,611,517 A | * | 9/1986 | Schmale ..................... 83/102.1 |
| 4,909,108 A | * | 3/1990 | Nakada et al. ........... 83/699.51 |
| 4,979,411 A | * | 12/1990 | Murasaki et al. ............. 83/156 |
| 5,038,654 A | * | 8/1991 | Mackey ....................... 83/880 |
| 5,097,731 A | * | 3/1992 | Vives et al. ................. 451/102 |
| 5,381,713 A | * | 1/1995 | Smith ........................... 83/881 |
| 5,408,909 A | * | 4/1995 | Suk .............................. 83/614 |
| 5,421,230 A | * | 6/1995 | Flaherty et al. ................. 83/13 |
| 5,475,196 A | * | 12/1995 | Lisec .................... 219/121.39 |
| 5,507,212 A | * | 4/1996 | Morrison ..................... 83/879 |
| 5,832,802 A | * | 11/1998 | Warthen et al. ............... 83/452 |
| 5,871,134 A | * | 2/1999 | Komagata et al. ............. 83/879 |
| 5,931,071 A | * | 8/1999 | Mori ........................... 83/582 |
| 6,138,546 A | * | 10/2000 | Hursey ........................ 83/875 |
| 6,434,974 B1 | * | 8/2002 | Lisec ......................... 225/104 |
| 6,460,258 B1 | * | 10/2002 | Shimotoyodome ........... 83/881 |

FOREIGN PATENT DOCUMENTS

| | | |
|---|---|---|
| AT | 403688 B | 4/1998 |
| DE | 19519093 A1 | 1/1996 |
| EP | 0708741 B1 | 5/1996 |

* cited by examiner

*Primary Examiner*—Allan N. Shoap
*Assistant Examiner*—Jason Prone
(74) *Attorney, Agent, or Firm*—Young & Thompson

(57) ABSTRACT

A blade is used to cut through a film between the panes of laminated glass in the area of a gap produced in the laminated glass the blade is provided on a holding device and can move along the gap. The holding device includes swiveling carrier on which there is a holding part for the blade with a vertical adjustment capacity. The blade is first placed next to the gap on the top of the top pane of the laminated glass. The vertical alignment of the blade is ascertained with a rule for determining the thickness of the laminated glass. Then the holding device is adjusted by a motor such that the blade falls into the gap. When a sufficient immersion depth of the blade into the gap is ascertained via the rule, the film is cut.

21 Claims, 6 Drawing Sheets

PROCESS AND DEVICE FOR CUTTING THROUGH FILMS IN LAMINATED GLASS

BACKGROUND OF THE INVENTION

The invention relates to a process for cutting films in laminated glass with a blade and a device which is suitable for executing the process and which is equipped with a blade.

Devices for cutting through the film of laminated glass as are known for example from EP 0 708 741 B are a component of devices for dividing laminated glass and are used to cut through the plastic film which is located between the panes of laminated glass after breaking the two panes and pulling them apart in order to complete separation of the laminated glass.

EP 0 708 741 B discloses a cutting device with a blade for cutting through the film in laminated glass.

The blade in the known device sits in a blade holding device which can be moved along the dividing line and can be swivelled around an axis which is aligned parallel to the movement device. In the known cutting device the blade is made with a straight cutting edge and is attached in a clamp block. So that the blade is also reliably guided in the gap between the parts of the laminated glass, when the film is cut, in front of the blade there is a guide disk which dips into the gap between the disks.

The problem in the known device is that difficulties can arise when the blade is not immersed deeply enough into the gaps between the panes in order to reliably cut through the film and that the blade can run onto the edges of the glass panes bordering the gap regardless of the guide disk and can be damaged in doing so. This occurs especially in a rough cut or for glass parts projecting into the gap.

SUMMARY OF THE INVENTION

The object of the invention is to devise a process and a device of the initially mentioned type which does not have these defects.

According to the process as claimed in the invention it is possible to proceed as follows.

The blade is seated on the surface of one (the top or the bottom) pane of laminated glass next to the opened gap by movement of the part of the device which holds the blade in the direction to the laminated glass. At this point the blade is pushed by lateral displacement, especially swivelling of the holding part around the axis aligned parallel to the cutting direction laterally, i.e. transversely to the gap, until the blade dips into the gap. At this point the blade is pushed further (lowered or lifted) until a measurement device, for example, a rule, establishes that the blade has been moved deeply enough into the gap to reliably cut the film. As soon as this has taken place, either the blade is held down, when it acts on the film from the top by its own weight and the weight of the holding part, this is optionally supported by (another) hydraulic cylinder, or, when the blade acts from underneath on the film, it is loaded upwardly in order to keep it engaged effectively for cutting through the film, and the cutting process can begin.

The procedure as claimed in the invention makes it possible for the blade to dip reliably into the gap between the two parts of the laminated glass when the laminated glass has moved for example when breaking the two glass panes in the direction of its surface extension, for example transversely to the gap relative to the original location in which the glass panes of the laminated glass have been scratched. Thus the blade always reliably finds the gap.

Advantageously, within the framework of the invention it is provided that for lateral adjustment of the blade in the "search" for the gap between the glass panes there is a hydraulic cylinder which engages the swivelling carrier.

The blade dips into the gap preferably such that a holding device similar to a parallelogram rod for the blade is actuated. The cylinder for adjusting the blade touching the top glass pane (and for raising the blade) is coupled to the blade holding device for example such that the blade is not pressed with force against the glass surface. This can be done by a peg-slot guide being provided between the blade holding device and the hydraulic cylinder or the component which the hydraulic cylinder engages.

The blade with which the process as claimed in the invention is carried out can be made as desired. Thus for example blades with a straight cutting edge can be used.

Preferably, within the framework of the invention a circular blade is used which makes it possible to move the sharp points of the blade into the working position by turning again and again. The blade is held on the holding part preferably using a clamping device which is equipped for example with a manually actuated thumb screw.

The device as claimed in the invention for cutting through the film of laminated glass can be used on optionally configured laminated glass cutting tables. Examples of these laminated glass cutting tables are described in EP 0 708 741 B, AT 403 688 B and in DE 195 19 093 A. In part the cutting device proposed as claimed in the invention with a blade can replace the other devices provided in the older proposals for cutting through the film between the panes of laminated glass.

BRIEF DESCRIPTION OF THE DRAWINGS

Other details and features of the invention result from the following description of preferred embodiments in which reference is made to the attached drawings.

Figure 1:
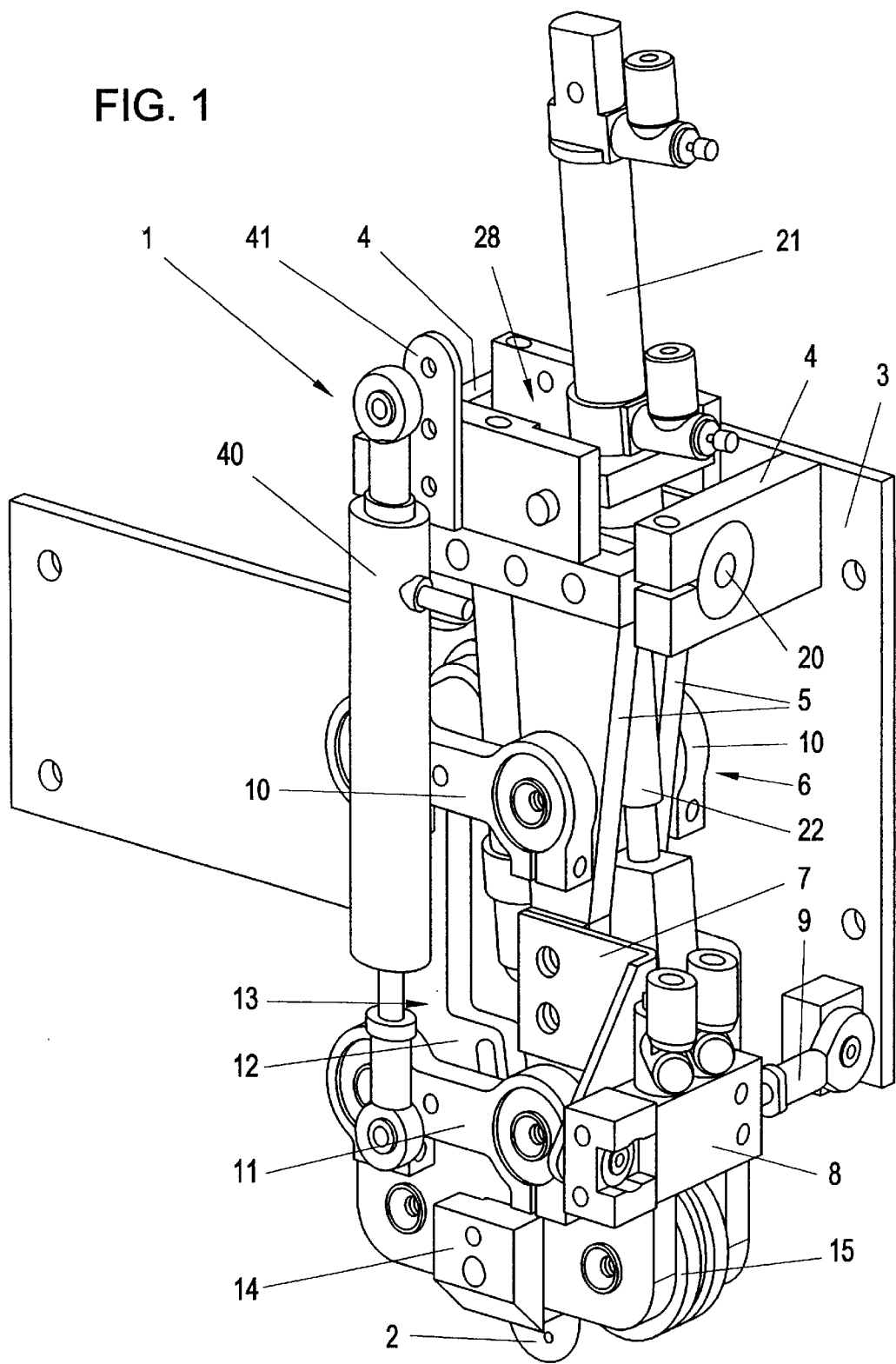
FIG. 1 shows in an oblique view a device as claimed in the invention.
Figure 2:
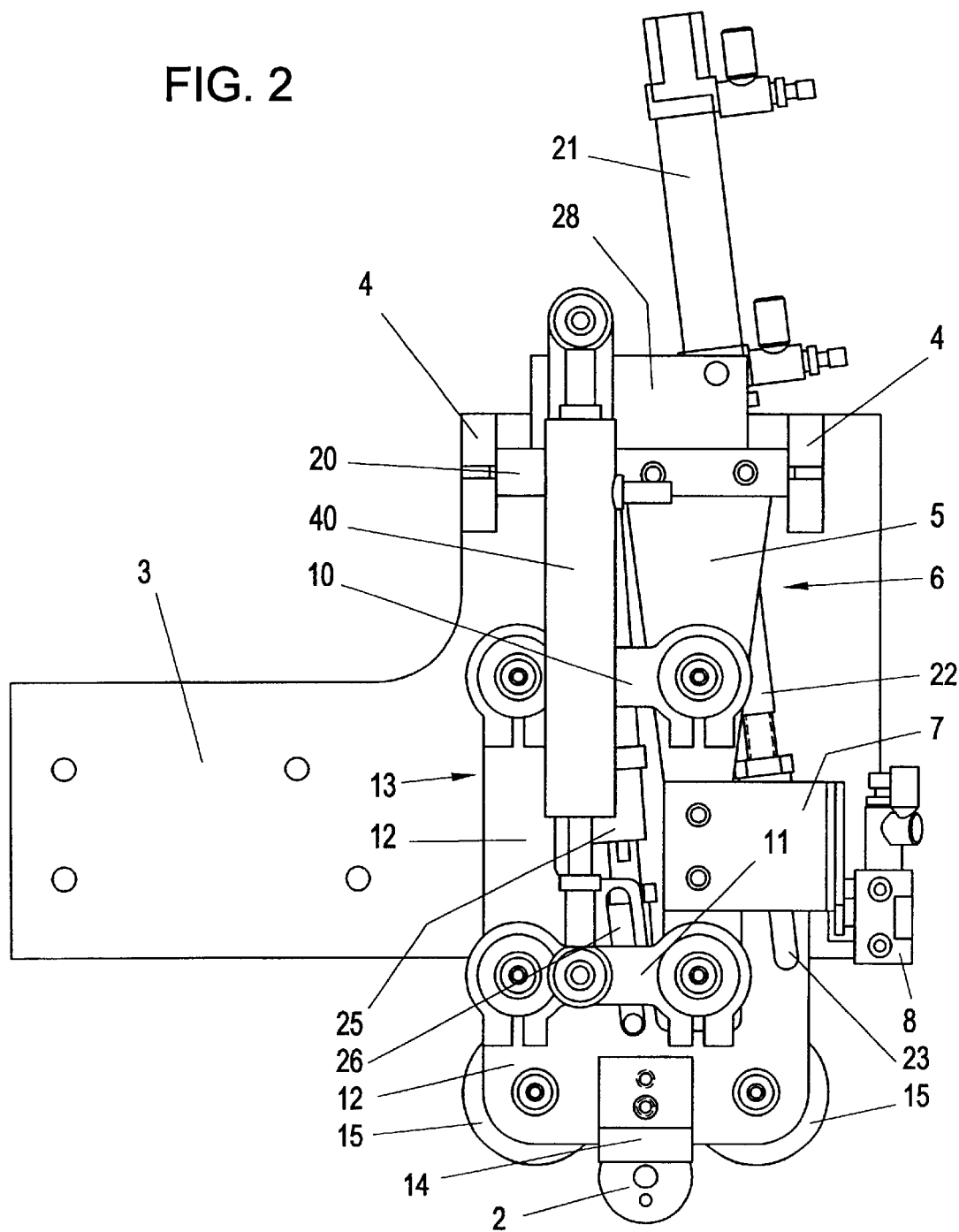
FIG. 2 shows a side view thereof.
Figure 3:
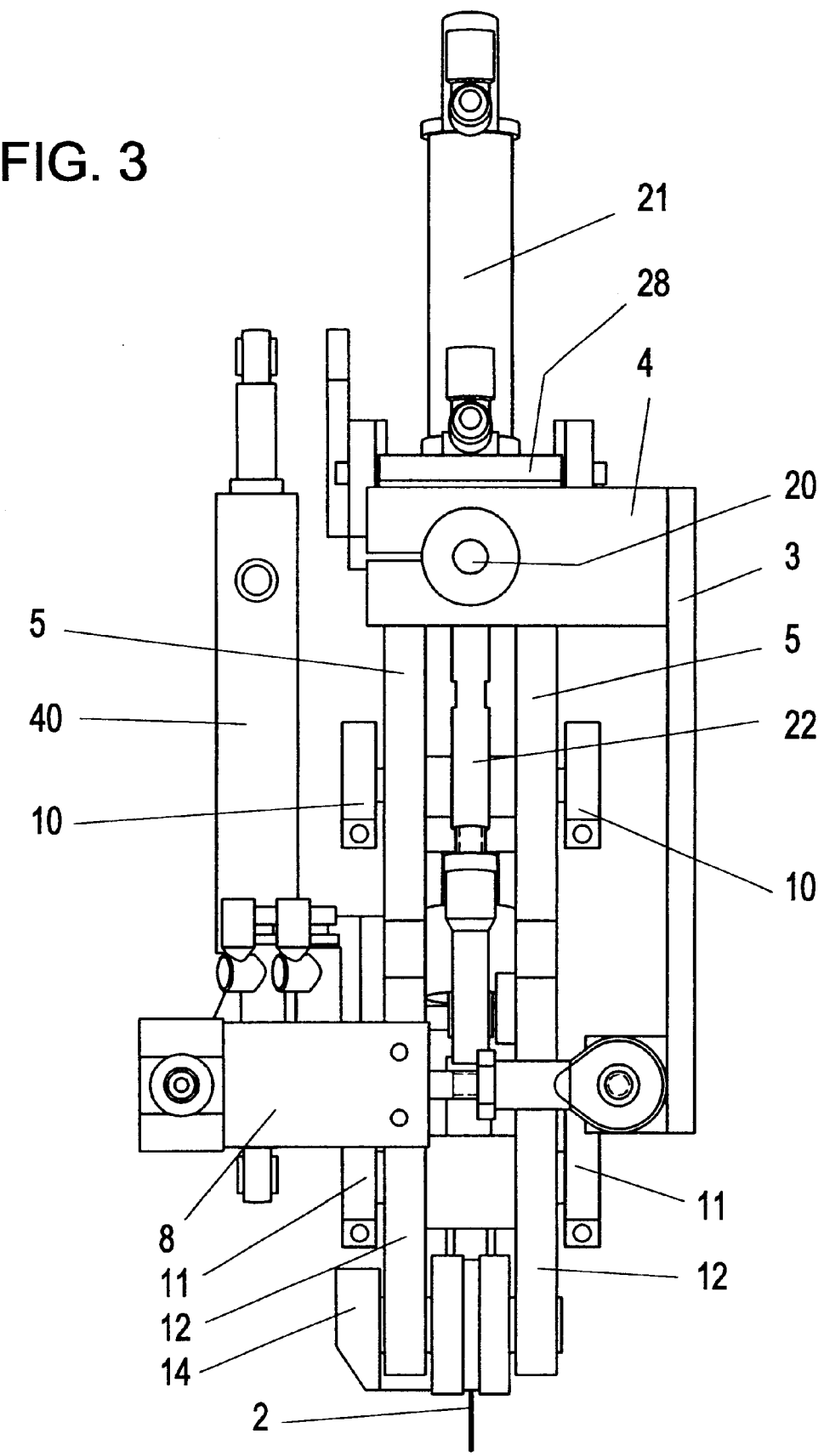
FIG. 3 shows a view from the left of FIG. 2.
Figure 4:
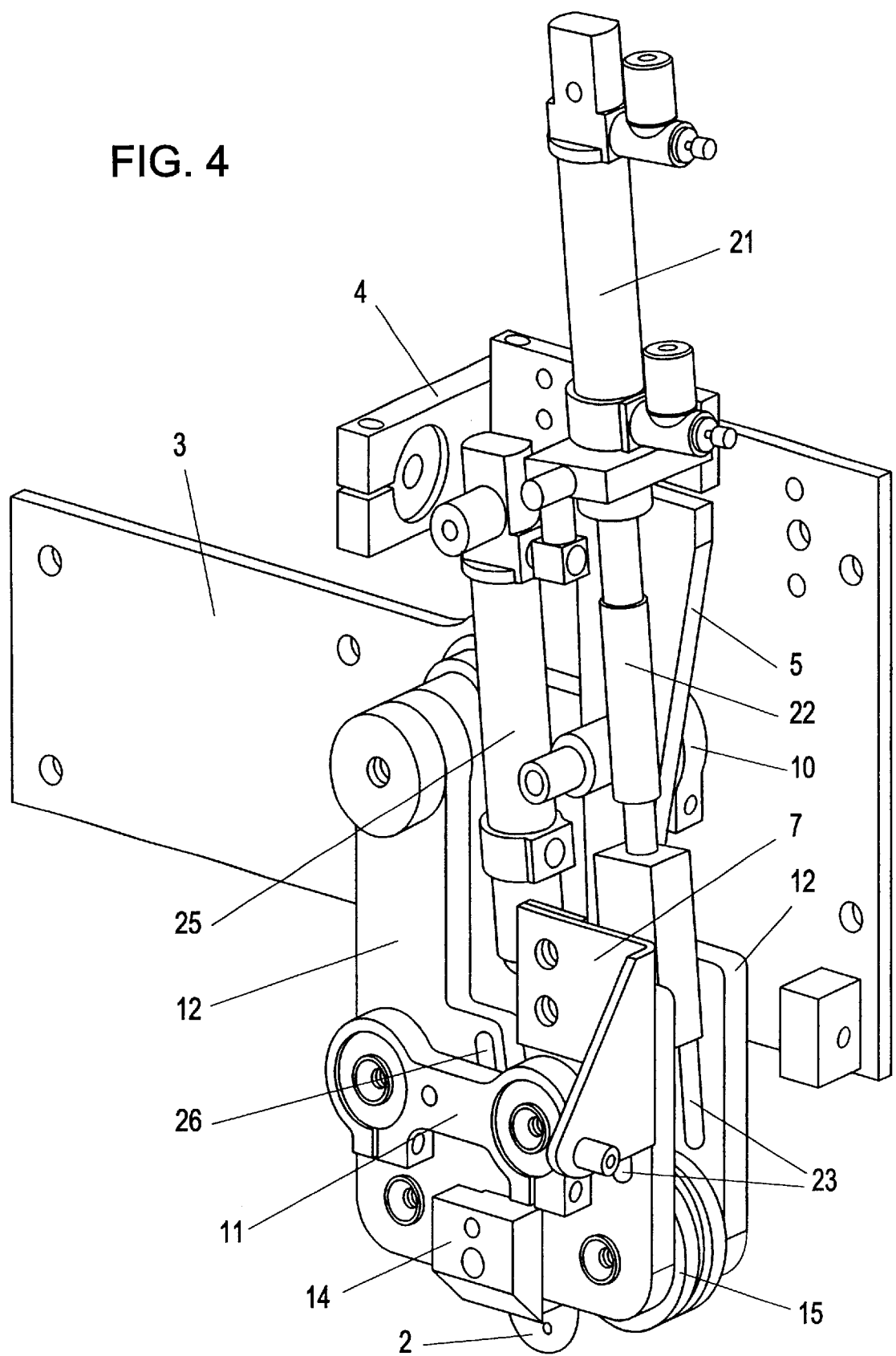
FIG. 4 shows a view similar to FIG. 1 with the components removed.
Figure 5:
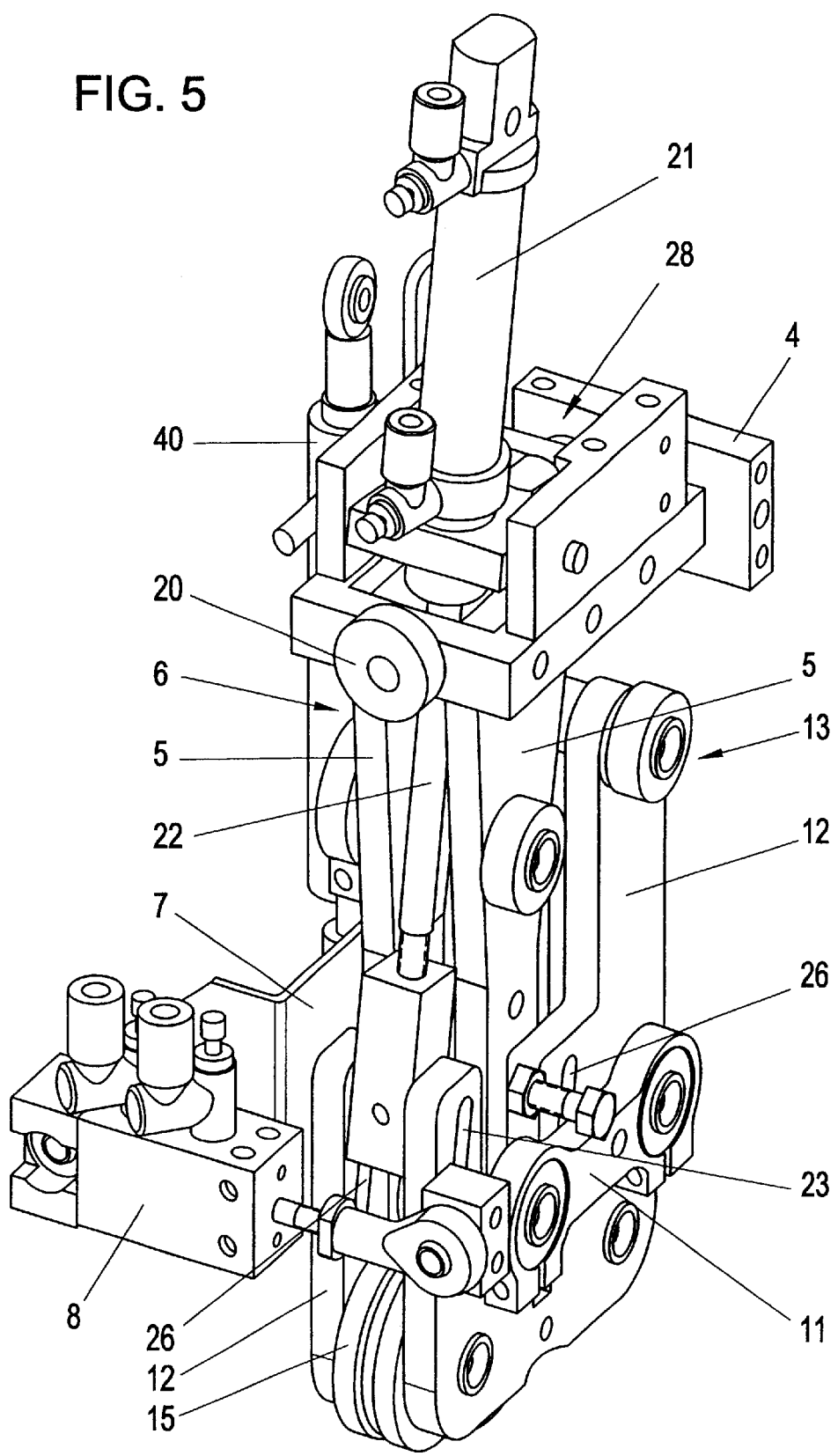
FIG. 5 shows an oblique view from the left of FIG. 1 without the installation plate, and FIGS. 6 and 7 in two different highly schematic representations show the device as claimed in the invention in two positions in its use.

Even if in the embodiment described below the blade fits into the film of laminated glass which is to be cut through from overhead, an arrangement is also possible in which the blade acts from underneath on the film, therefore the holding device for the blade is located underneath the laminated glass pane to be divided.

DETAILED DESCRIPTION OF THE PREFERRED EMBODIMENTS

The holding device 1 which is shown in FIGS. 1 to 5 for a cutting blade 2 of a device for cutting through plastic film in laminated glass as is known for example from EP 0 708 741 B can be movably guided on a guide transversely over the laminated glass. For example, on the guide a carriage can be moved which in addition to the holding device 1 for the blade 2 also bears a cutting wheel or its holding device so that one drive is enough for moving the cutting wheel when scratching the top glass pane on the one hand and the blade 2 which is inserted subsequent to opening the gap after breaking the two glass panes of the laminated glass pane on the other hand.

The holding device 1 for the cutting blade 2 is mounted via a base plate 3 on a carriage (not shown) which can be moved transversely over the cutting table. On two brackets 4 which project in the upper area from the base plate 3, around the horizontal axis 20 which is aligned parallel to the direction of motion or parallel to the cutting direction, a swivelling part 28 is swivel-mounted, from which a carrier 6 consisting of two plates 5 parallel to one another project down. To swivel the carrier 6 on the plate 5 over an angle 7 a hydraulic cylinder 8 is mounted with a piston rod 9 which is supported on the base plate 3 in the lower area.

On the carrier 6 on top of one another two pairs of parallelogram arms 10, 11 are swivel-mounted around axes which are aligned parallel to one another, which are horizontal, and which are aligned transversely to the direction of motion. The free ends of these parallelogram arms 10 and 11 are mounted on a holding part 13 which consists of two plates 12 parallel to one another so that it can be moved up and down as the parallelogram arms 10, 11 are swivelled relative to the carrier 6.

In the holding part 13 underneath there is a clamp 14 which can be actuated for example by a thumb screw (not shown) for the cutting blade 2 which is made round in the embodiment of the invention which is shown.

On the holding part 13 underneath, therefore in front of and after the cutting blade 2 there are rollers 15 which in an emergency run on the top 32 of the laminated glass 31 to be cut in order to prevent damage to the holding device 1 or damage to the laminated glass 31 if the holding part 13 of the blade 2 for whatever reason should be lowered further. Therefore they are emergency running rollers 15.

On the swivelling part 28 which bears the plates 5 and which is swivel-mounted in the axle 20 that is mounted in the brackets 4 a hydraulic cylinder 21 is supported at the top, with a piston rod 22 which fits into the slots 23 in the plates 12 of the holding part 13 via transverse pins.

Another hydraulic cylinder 25 which is supported in the upper section of the carrier 6, therefore can be swivelled with it, fits with a transverse pin into other slots 26 in the plates 12 of the holding part 13.

By actuating the cylinder 21 for purposes of shortening its effective length (retracting its piston rod 22) the holding part 13 is raised relative to the carrier 6 as the parallelogram rods 10, 11 are swivelled, in this case the cylinder 25 having already been moved beforehand into its position in which its transverse pin is held on the top ends or in the area of the top ends of the slots 26 in the holding part 13.

Figure 6:
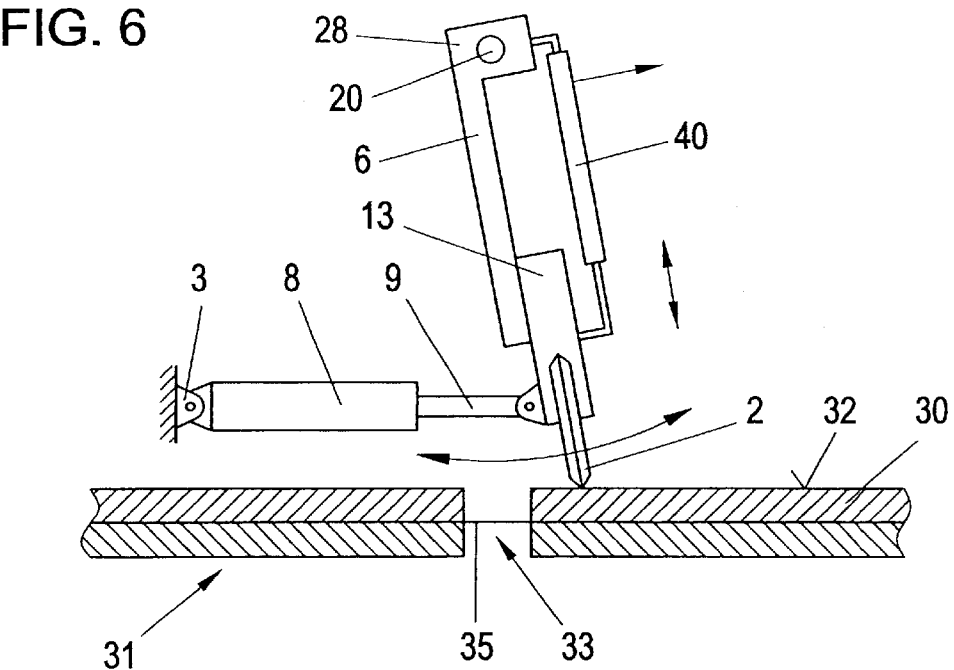

The cylinder 21 which is the drive which is used exclusively for lifting the blade 2 therefore acts as a lifting and lowering cylinder, is actuated to keep the blade 2 above the laminated glass and to seat the blade 2 on the top 32 of the laminated glass 31. This cylinder 21 is not used to press the blade 2 against the top glass pane 30 or the film 35 which is to be cut through. When the blade 2 is seated on the top glass pane, as is shown in FIG. 6, next to the gap, the pins on the piston rod 22 of the lifting cylinder 21 and the press-down cylinder 25 are each located roughly in the middle of the slots 23 or 26 in the holding part 13 (therefore at a distance from the two ends of the slots 23 and 26) so that the blade 2 is first loaded downward simply under its own weight and the weight of the holding part which bears it.

Figure 7:
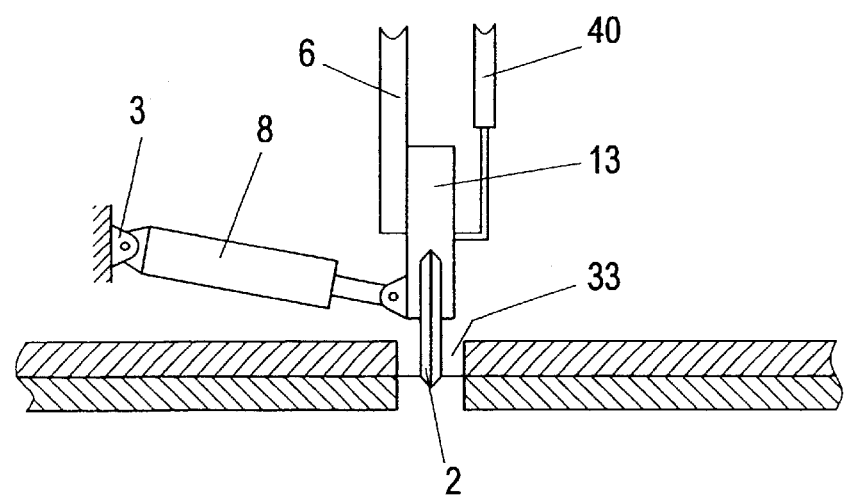

By actuating the cylinder 8 for lateral swivelling of the carrier 6 the blade 2 is moved transversely to the direction of the gap 33 until it falls into it as is shown in FIG. 7. At this point, by forcing the press-down pressure cylinder 25 down its piston rod can be advanced so far that the transverse pins attached on its free end adjoin the lower end of the slots 26 and load the blade 2 additionally downward. This ensures that the blade 2 when executing the cutting process especially at its start does not run up from the plastic film.

In principle it is conceivable to change the function of the cylinders 21 and 25 relative to the described function such that the cylinder 25 assumes the lifting and lowering function for the blade 2 and the cylinder 21 loads the blade 2 downward when the film 35 is being cut.

But often loading the blade 2 by the weight of the holding part 13 alone is enough to reliably cut through the film 35 so that only one drive is enough for lifting and lowering the holding part 13, but the cylinder for loading the blade 2 is dispensable.

Between the swivelling part 28 which can be swivelled around the shaft 20, therefore on the top end of the carrier 6, on a clip 41 the one end of a rule 40 is supported. The other lower end of the rule 40 is connected to one of the parallelogram arms 10 or 11, in the embodiment shown to the external lower parallelogram rod arm 11. The rule 40 is thus able to acquire the position of the holding part 13 and thus the position of the cutting blade 2 which is attached to the holding part 13 via the clamping device 14. Furthermore, a rule 40 can be used (as will be described later) to acquire the lifting motions of the cutting blade 2 and the location of the cutting blade 2, when it is seated on the top 32 of the top pane 30 of laminated glass 31, relative to a (defined) zero point.

In practice, with the device as claimed in the invention it is possible to proceed as follows (Compare FIGS. 6 and 7).

First, by extending the piston rod 22 of the "lifting and lowering" cylinder 21 the holding part 13 with the cutting blade 2 is seated on the top 32 of the top glass pane 30 of the laminated glass 31 since the panes of laminated glass after scratching have been broken and the gap 33 in the laminated glass 31 has been opened by pulling apart the two parts, as the film 35 which is located in between is heated using a heating device (not shown).

By moving the cutting blade 2 sideways with the cylinder 8 the cutting blade 2 is moved into the gap 33 and under its own weight and that of the holding part 13 drops into the gap 33 until it assumes the position which is shown in FIG. 7 (next to the film 35 or as the start of the film 35 is cut). The rule 40 which is coupled to the holding part 13 ascertains whether the blade 2 has been immersed so far that it is in fact also able to cut through the plastic film 35. To do this first the position of the blade 2 as shown in FIG. 6 is acquired and from the thickness of the laminated glass 31 which has been determined in this way the required immersion depth is computed (generally half the thickness of the laminated glass pane 31). As soon as the blade assumes the position shown in FIG. 7, it is ascertained by the rule 40 whether the immersion depth is enough and only when this has been actuated is the feed drive for the holding device 1 released for executing the cutting operation using the blade 2.

When the device as claimed in the invention is arranged such that the blade 2 is immersed from underneath into the gap 33 between the two parts of the laminated glass 31, the holding device can reasonably be built as was explained above using FIGS. 1 to 5 for the holding device 1 with the blade 2 dipping into the gap 33 from overhead. In this case of course the holding part 13 cannot be made heavy, as can be the case in the holding device 1 with the blade 2 which fits into the gap 33 from overhead, but must be loaded to the top. To do this the hydraulic cylinders 21 and/or 25 which are provided for moving the holding part 13 for the blade 2 can be used.

Also, when the blade 2 dips into the gap 33 from underneath it is possible to reasonably proceed as was described using FIGS. 6 and 7 for the blade 2 which fits from overhead into the gap 33.

First the blade 2 is placed next to the gap 33 on the bottom of the lower pane of the laminated glass 31, then pushed transversely to the lengthwise extension of the gap 33 until the blade 2 dips into the gap 33. The required penetration depth of the blade 2 into the gap 33 which is necessary for effectively cutting through the film 35 can be reasonably determined as has been described for a blade 2 which dips into the gap 33 from overhead using FIGS. 6 and 7.

In summary one preferred example of the device as claimed in the invention can be described as follows:

To cut through the film 35 between the panes of laminated glass 31 in the area of the gap 33 which is produced in the laminated glass 31 a blade 2 which is provided on a holding device 1 which can be moved along the gap 33 is used. The holding device 1 consists of a swivelling carrier 6 on which there is a holding part 13 for the blade 2 with a vertical adjustment capacity. The blade 2 is first seated next to the gap 33 on the top 32 of the top pane 30 of the laminated glass 31. The vertical alignment of the blade 2 is ascertained with a rule 40 for determining the thickness of the laminated glass 31. Then the holding device 6 is adjusted by a motor 8 such that the blade 2 falls into the gap 33. When a sufficient immersion depth of the blade 2 into the gap 33 is ascertained via the rule 40, the film 35 is cut.

What is claimed is:

1. Device for cutting through plastic films in laminated glass, comprising:
    an axle;
    a holding device mounted to swivel about the axle;
    a blade connected to the holding device and which is swivelable about the axle, said axle being parallel to a gap between two parts of a laminated glass, said blade being movable along the gap; and
    a drive for swiveling the holding device and the blade around the axle so that the blade moves transversely across the glass from a first position on the glass to a second position in the gap,
    wherein a holding part which bears the blade is vertically adjustable relative to a carrier which is suspended pendulous on a base plate of the holding device, relative to the carrier.

2. Device as claimed in claim 1, further comprising a parallelogram coupling the holding part to the carrier.

3. Device as claimed in claim 1, wherein the carrier (6) has two plates (5) which point down from a swivelling part (28) which is mounted on a shaft (20).

4. Device as claimed in claim 1, wherein there are four parallelogram arms for adjustable connection between the carrier and the holding part.

5. Device as claimed in claim 1, wherein the carrier further comprises a swiveling part, on the swiveling part of the carrier, a hydraulic cylinder is supported which is coupled to the holding part.

6. Device as claimed in claim 5, wherein a free end of a piston rod of the hydraulic cylinder has a peg coupled to a slot of the holding part to form a slot—peg coupling.

7. Device as claimed in claim 6, wherein the cylinder (21) is intended solely for raising/lowering the holding part (13) relative to the carrier (6).

8. Device as claimed in claim 6, wherein the holding part is freely movable so in that a working position of the blade a transverse pin on the end of the piston rod is located at a distance from ends of the slot.

9. Device as claimed in claim 5, wherein there is another hydraulic cylinder which is supported on the swiveling part and is coupled to the holding part.

10. Device as claimed in claim 9, wherein the other cylinder has a peg coupled to a slot of the holding part to form a peg-slot coupling.

11. Device as claimed in claim 9, wherein the other cylinder is designed solely for loading the holding part downward.

12. Device as claimed in claim 1, wherein on the holding part rollers are mounted to be able to turn in front of and behind the blade.

13. Device as claimed in claim 1, wherein between the carrier and the holding part there is a role.

14. Device as claimed in claim 13, wherein the rule (40) is supported with one end on the swivelling part (28) of the holding part (6) and with its other end on the holding part (13).

15. Device as claimed in claim 14, wherein one end of the rule (40) is coupled to one of the parallelogram rod arms (10, 11).

16. Device as claimed in claim 1, wherein the blade is a round blade.

17. Device as claimed in claim 1, wherein the blade is mounted on the holding part by a clamp block.

18. Device as claimed in claim 1, wherein the drive is a double-acting hydraulic motor.

19. Device as claimed in claim 18, wherein the hydraulic motor (8) is a compressed air cylinder.

20. A process for cutting through plastic films in laminated glass using a blade, comprising the steps of:
    scratching top and bottom panes that together form two panes of laminated glass;
    breaking the two panes of laminated glass to form two parts;
    pulling the two parts of the laminated glass apart to open between the two parts of the laminated glass a gap in which a film which is located between the two panes of laminated glass lies freely;
    placing the blade next to the gap on the laminated glass;
    acquiring a location of the blade which has been placed on the laminated glass;
    determining from the location of the blade, a thickness of the laminated glass;
    determining a required penetration depth of the blade into the gap between the part of the laminated glass from the thickness of the laminated glass; and
    moving the blade transversely to a lengthwise extension of the gap between the two parts of the laminated glass in a direction towards the gap until the blade reaches the area of the gap;
    moving the blade into the gap;
    moving the blade along the gap to cut through the film;
    monitoring the penetration depth of the blade into the gap between the parts of the laminated glass.

21. Process as claimed in claim 20, wherein the thickness of the laminated glass is determined on the one hand by the location of the blade which has been placed on the laminated glass next to the gap and the location of the surface of the laminated glass opposite the blade is determined as the defined zero point.

* * * * *